United States Patent
Kawasaki (10) Patent No.: US 6,335,695 B1
(45) Date of Patent: Jan. 1, 2002

(54) MAP DISPLAY APPARATUS (75) Inventor: Koji Kawasaki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/620,569

(22) Filed: Jul. 20, 2000

(30) Foreign Application Priority Data

Jul. 21, 1999 (JP) .......................................... 11-206500

(51) Int. Cl.$^7$ .............................................. G08G 1/123
(52) U.S. Cl. ...................... 340/995; 340/990; 701/207; 701/209
(58) Field of Search ................................ 340/995, 990, 340/988; 701/201, 207, 209, 210; 345/126, 127

(56) References Cited

U.S. PATENT DOCUMENTS

| | | | |
|---|---|---|---|
| 4,862,388 A | * 8/1989 | Bunker | 340/747 |
| 5,383,457 A | * 1/1995 | Cohen | 73/625 |
| 5,450,329 A | * 9/1995 | Tanner | 340/993 |
| 5,469,360 A | * 11/1995 | Ihara et al. | 340/990 |
| 5,596,494 A | * 1/1997 | Kuo | 701/207 |
| 5,617,319 A | * 4/1997 | Arakawa et al. | 340/995 |
| 5,902,349 A | * 5/1999 | Endo et al. | 701/209 |

FOREIGN PATENT DOCUMENTS

| | | |
|---|---|---|
| JP | 3-27083 | 2/1991 |
| JP | 4-125418 | 4/1996 |
| JP | 8-328462 | 12/1996 |
| JP | 9-153131 | 6/1997 |

\* cited by examiner

*Primary Examiner*—John Tweel
(74) *Attorney, Agent, or Firm*—Law Offices of David G. Posz

(57) ABSTRACT

A vehicular navigation system for displaying map data generated by assuming that an area surrounded by particular longitudes and particular latitudes is a rectangle or a square, and for adequately correcting distortion of map with restricting a decrease of a map drawing speed. A vehicular navigation system determines a distortion correction coefficient Hs at a detected present position, and generates a coordinate conversion correction coefficient table Ht by multiplying the distortion correction coefficient Hs by a sine value of a rotation angle. While drawing the map, the system converts map data by using the coordinate conversion correction coefficient table Ht. The coordinate values X and Y after conversion can be respectively calculated by $X=\beta x-\alpha y$, $Y=\alpha x+\beta y$, by using the coordinate conversion correction coefficient $\alpha$ with respect to the sine value of the rotation angle $\theta$ in the map and the coordinate conversion correction coefficient $\beta$ with respect to the cosine value of the rotation angle $\theta$ in the map. As a result, the number of multiplications is reduced. Then it can adequately correct the distortion of the map by restricting a decrease of a map drawing speed.

17 Claims, 4 Drawing Sheets

| θ (deg) | Ht | θ (deg) | Ht |
|---|---|---|---|
| 0 | 0 | 50 | 45183 |
| 5 | 5141 | 55 | 48316 |
| 10 | 10242 | 60 | 51080 |
| 15 | 15266 | 65 | 53456 |
| 20 | 20173 | 70 | 55425 |
| 25 | 24927 | 75 | 56973 |
| 30 | 29491 | 80 | 58086 |
| 35 | 33831 | 85 | 58758 |
| 40 | 37913 | 90 | 58982 |
| 45 | 41707 | | |

MAP DISPLAY APPARATUS

CROSS REFERENCE TO RELATED APPLICATION

This application is based upon Japanese Patent Application No. Hei. 11-206500 filed on Jul. 21, 1999, the contents of which are incorporated herein by reference.

BACKGROUND OF THE INVENTION

1. Field of the Invention

This invention relates to map display apparatuses, and particular to a map display apparatus for displaying a map based on map data that can correct a distortion of the map data, wherein the map is generated by assuming that an area surrounded by particular longitudes and particular latitudes is a rectangle or a square.

2. Related Art

Conventionally, a map display apparatus such as a vehicular navigation system generally includes a function for displaying a map including a present position and/or a target position (destination) assigned by a user. In general, map data used in such a system is generated by assuming that an area surrounded by particular longitudes and particular latitudes is a rectangle or a square. Specifically, the map data is administrated every predetermined longitude width and every predetermined latitude width, and is normalized to the same size blocks.

In this case, since the data is normalized so that an actual length at a predetermined reference latitude point is accurate, a low latitude area positioned lower than the reference latitude point is normalized shorter than the actual length. On the other hand, a high latitude area positioned higher than the reference latitude point is normalized longer than the actual length. Therefore, a distortion becomes larger while moving away from the reference latitude. In order to solve the above problem, a map display method in which drawing coordinate data is converted by using a correction coefficient, wherein the correction coefficient is a fixed value that corresponds to a ratio of actual length of longitude width and latitude width of a block to be displayed. However, since this map display method converts the map data by using a constant value, the map around the Tokyo area may be accurately displayed without distortion. However, the map around Hokkaido may be distorted as a result of an inaccurate aspect ratio.

A countermeasure to solve this problem is disclosed in JP A 8-328462. According to this countermeasure, the correction coefficient is determined by calculating an approximated rectangle based on the latitude of a center point in a map to be displayed during displaying. However, when the direction of travel on the map is changeable, it needs a multiplication process to calculate a rotation angle of the map with reference to a reference direction and the correction coefficient. Specifically, since data for all points of the map to be displayed are converted every time the map is displayed, it needs two calculation processes including an enlarge/reduce process of the map by using the multiplication of the correction coefficient, and a rotation process of the map by using the multiplication of the rotation angle. Furthermore, since these processes are necessary for all coordinates within the map to be displayed every time the map is drawn, it takes a long time to draw the map.

SUMMARY OF THE INVENTION

This invention has been conceived in view of the background thus far described, and its first object is to adequately correct distortion of a map by restricting a decrease of a map drawing speed.

Its second object is to provide a map display apparatus for displaying map data generated by assuming that an area surrounded by particular longitudes and particular latitudes is a rectangle or a square, and for adequately correcting distortion of map with restricting a decrease of a map drawing speed.

According to a first aspect of the present invention, distortion correction coefficients are previously stored in a distortion correction coefficient storage portion by a unit of a predetermined latitude width. A display control portion reads out a particular distortion correction coefficient corresponding a latitude of a particular point in a target area, and generates a map by converting a previously stored map data using the particular distortion correction coefficient.

Since the present invention uses the previously stored distortion correction coefficients, it becomes unnecessary to calculate the distortion correction coefficients every time a map is drawn. As a result, it can adequately correct distortion of map with restricting a decrease of a map drawing speed.

According to a second aspect of the present invention, in addition to the first aspect of the present invention, a coordinate conversion correction coefficient storage portion stores coordinate conversion correction coefficients by a unit of a predetermined latitude width with respect to each rotation correction coefficient corresponding to each rotation angle. The coordinate conversion correction coefficients are determined by multiplying the rotation correction coefficient corresponding to each rotation angle by the distortion correction coefficient. Therefore, when the coordinate conversion is performed by using the coordinate conversion correction coefficient, a multiplication process of the correction coefficient can be substantially performed at the same time. Therefore, it can eliminate a process for multiplying the correction coefficient of the rotation angle by the distortion correction coefficient while drawing the map.

According to a third aspect of the present invention, a present position detection portion detects a present position. A distortion correction coefficient determination portion determines a distortion correction coefficient at a latitude of the present position detected by the present position detection portion after power on. A distortion correction coefficient storage portion stores distortion correction coefficient determined by the distortion correction coefficient determination portion. A display control portion converts the map data using the particular distortion correction coefficient stored in the distortion correction coefficient storage portion. As a result, an amount of data to be stored can be reduced.

BRIEF DESCRIPTION OF THE DRAWINGS

These and other objects, features and characteristics of the present invention will be appreciated from a study of the following detailed description, the appended claims, and drawings, all of which form parts of this application. In the drawings, same portions or corresponding portions have the same numerals in order to eliminate redundant explanation. In the drawings:

DESCRIPTION OF THE PREFERRED EMBODIMENTS

Hereinafter, an embodiment in which the present invention is applied will be explained with reference to drawings. It should be noted that the present invention is not limited to the following embodiments, and can be applied to the other apparatuses.

Figure 1:
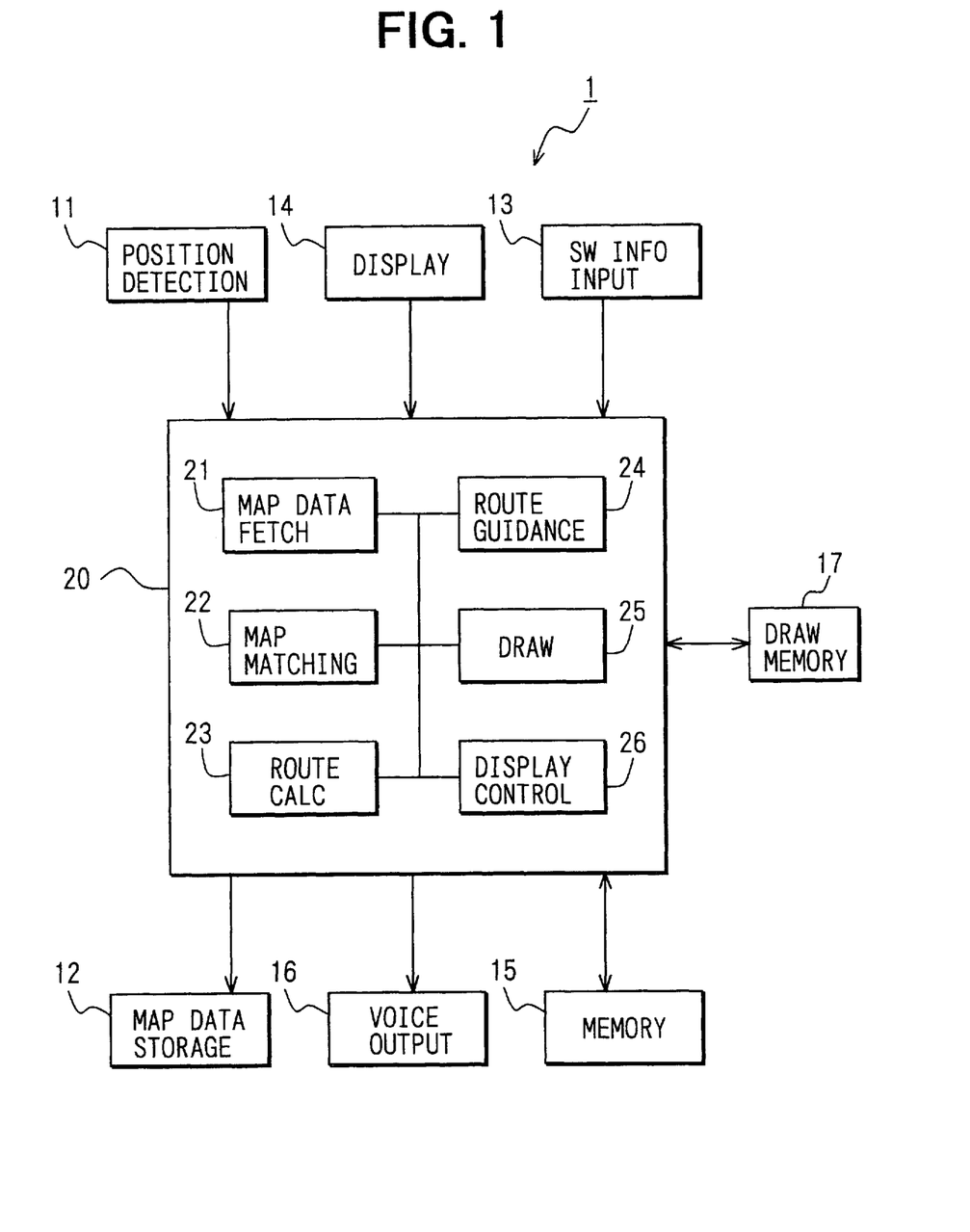
FIG. 1 is a schematic block diagram illustrating a vehicular navigation system including a map display apparatus according to the present invention.

FIG. 1 shows a block diagram schematically illustrating a vehicular navigation system 1 including a map display apparatus. The navigation system 1 is constructed with a position detection portion 11, a map data storage portion 12, a switch information input portion 13, a display portion 14, a memory portion 15, a voice sound output portion 16, a drawing memory portion 17, a control portion 20, and so on.

The position detection portion 11 includes a GPS receiver for a GPS (Global Positioning System) that detects a vehicular position based on a gyroscope, a distance sensor, and radio signals from a satellite. Here, since each of the sensors has different types of detection errors, each of the sensors performs highly accurate position detection by interpolating the detection errors of other sensors. It is not necessary to provide all of these sensors. Depending on the level of desired detection accuracy, one of them can be selectively provided.

The map data storage portion 12 stores several kinds of data including so-called map matching data for increasing an accuracy of the position detection and map data. Road data is formed so that a map is formed by connecting plural nodes such as intersections by using links. In this road map, link information with respect to a link is also stored. The link information includes an identification number for specifying a link (link ID), a link length for indicating a length of the link, x and y coordinates at a start point and an end point of the link, a road width of the link, and a type of the road (road information such as a toll road). A CD-ROM, a DVD or hard disk unit is generally used as a storing medium, however, another medium such as a memory card may be used. Here, in such a case, a CD player or a DVD player is used to read out the data from the storing medium.

The switch information input portion 13 is for inputting several types of information, and is constructed with a touch switch integrally formed with a display unit of the display portion 14, or a mechanical switch assembled around the display unit. The touch switch is made up of plural infrared ray sensors which are vertically and laterally arranged on a display screen. When an infrared ray is interrupted by a finger or a touch pen, an interrupted position is detected as a two dimensional coordinate (X, Y). Here, the several inputs may be performed by using a remote controller (not shown). In this case, a remote control sensor may be further provided.

The display portion 14 can display a vehicular present position mark inputted from the position detection portion 11 by superimposing the map data inputted from the map data storage portion 12. Furthermore, the display portion 14 can additionally display a guidance route to be displayed on the map or additional data such as landmark of an assigned point described later, by superimposing the map data.

The voice sound output portion 16 is formed so that travel guidance is performed to a driver by using voice via a speaker. Therefore, the travel guidance to the driver is performed by using the display via the display portion 14 and the voice sound via the voice sound output portion 16.

Incidentally, the memory portion 15 stores a program for executing several processes regarding navigation function, and is used as a work memory during the execution of the program. Furthermore, the memory portion 15 is also used as a temporary memory for temporarily storing the map data fetched from the map data storage portion 12.

Next, the control portion 20 will be explained. The control portion is constructed with a computer including a CPU, a ROM, a RAM, an I/O, and a bus line for connecting each of these components. In FIG. 1, these constructions are shown as a functional block. That is, the control portion 20 includes a map data fetch portion 21, a map matching portion 22, a route calculation portion 23, a route guidance portion 24, a draw portion 25, and a display control-administration portion 26.

The map matching portion 22 specifies a present position on the map, depending on present position data detected by the present position detection portion 11, a road shape data included in the map data stored in the map data storage portion 12. Furthermore, a user can input several instructions such as displaying a desired map by using the switch information input portion 13, and can set a destination.

The route calculation portion 23 calculates a route to the destination from the present position calculated by the map matching portion 22 or from the departure point set by the user. Dijkstra's algorithm may be used to automatically set adequate routes. The route guidance portion 24 calculates several points at which the route guidance is to be provided, and decides contents of the route guidance (for example, turning right or turning left), based on a calculated result of the route calculation portion 23, the route shape data included in the map data, position data of intersections, position data of railroad crossings, or the like.

The draw portion 25 draws a map including the present position, a schematic map of a high way, or an enlarged map of an intersection at the intersection into the draw memory portion 17 that is made up of VRAM or the like, based on an instruction from the display control-administration portion 26. The drawn map is displayed on the display portion 14 in response to the instruction from the display control-administration portion 26.

The map data fetch portion 21 fetches the map data which is necessary for each of the above processing portions from the map data storage portion 12, and supplies to each of the above processing portions. Here, each of the processes is executed based on the program in the memory portion 15, and is executed by using the work memory in the memory portion 15.

Here, the way to draw the map into the draw memory portion 17 will be explained. In the map data storage portion 12, the map data is stored by a small area unit (hereinafter, called "drawblock"). This unit corresponds to a primary mesh or a secondary mesh regulated by the JIS (Japanese Industrial Standards). A finer area or broader area may be applied depending on a required scale of the map to be displayed. In the draw block, in the case of the road data, the data is stored as a coordinate train of points along the road shape by using a coordinate system whose origin is the left bottom portion of the draw block. In the case of rivers or facilities specified by area, the data is stored as a coordinate train of polygons by using the same. Here, the data of the road or the river in the draw block is generated by assuming that the data is displayed in a north side up direction. Therefore, when the map is drawn in the draw memory portion 17, the map display apparatus 14 first determines to which address in the draw memory portion 17 the origin of the draw block corresponds by using a difference between a latitude and a longitude of a target point to be displayed and a latitude and a longitude of the origin of the draw block. Furthermore, when the map is displayed differently from the north side up in response to a travel direction of the vehicle, a rotation process is performed in accordance with a rotation angle from a north direction as a reference direction, so that a drawing position in the draw memory portion 17 is changed.

Next, a process executed by the control portion 20 will be explained with reference to a flowchart shown in FIG. 2.

When the navigation system 1 is turned on (power on) (S110), the map matching portion 22 calculates a latitude and a longitude of the present position by using present position data detected by the position detection portion 11 and the road shape data included in the map data stored in the map data storage portion 12 (S120).

At step S130, the control portion 20 judges whether a latitude range to which the latitude of the present position calculated in this time belongs has changed from a latitude range to which the latitude of the present position calculated in the last time. When the latitude range has changed (S30:YES), the control portion 20 performs steps S140 and S150 to generate a correction coefficient table for coordinate conversion. On the contrary, when the latitude range has not changed (S130:NO), the control portion 20 moves to step S160 by skipping the steps S140 and SI 50, because the correction coefficient table for coordinate conversion generated in the last time can be used in this time.

At step S140, the control portion 20 determines the distortion correction coefficient based on the latitude of the present position calculated at step S120. Hereinafter, the distortion correction coefficient will be explained. The map data stored in the map data storage portion 12 is administrated every predetermined latitude width and predetermined longitude width, and is normalized to the same size blocks. Specifically, the map data is prepared so that each area surrounded by the predetermined latitudes and the predetermined longitudes is assumed to be a rectangle or a square, but is not to be a trapezoid. In this case, since the data is normalized so that an actual length at a predetermined reference latitude point is accurate, a low latitude area positioned lower than the reference latitude point is normalized shorter than an actual length. On the other hand, a high latitude area positioned higher than the reference latitude point is normalized longer than an actual length. Therefore, distortion increases while moving away from the reference latitude.

Figure 3A:
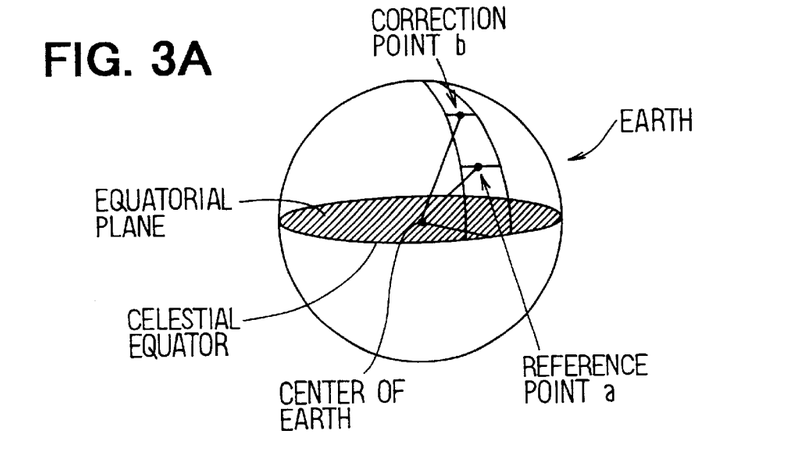
FIGS. 3A, 3B and 3C are diagrams illustrating a distortion correction coefficient.
Figure 3B:
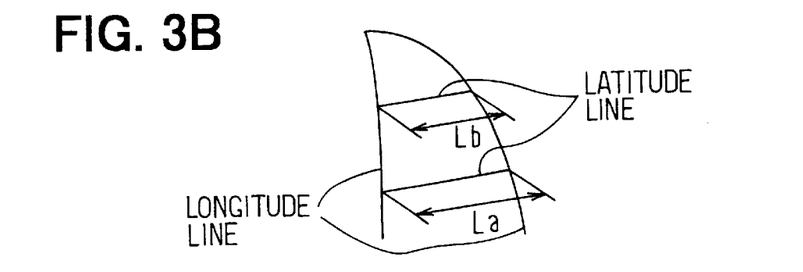
Figure 3C:
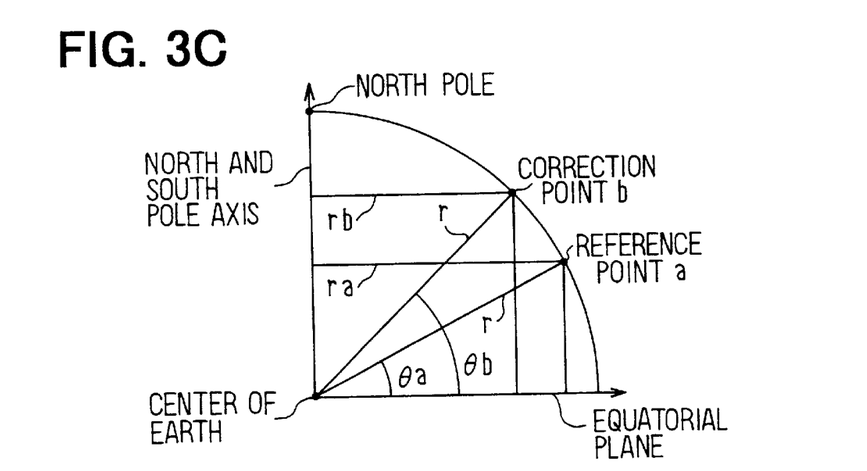

In order to correct such a distortion, as shown in FIG. 3, it needs to calculate a ratio of an actual length La in a latitude line direction in the block at the reference latitude point (reference point) a and an actual length Lb in a latitude line direction in the block at a correction target latitude point (correction point) b; and it needs to move a coordinate point by an amount corresponding to the ratio.

Here, the ratio of the actual lengths La and Lb is the same as a ratio of ra and rb shown in FIG. 3C. The ra and rb are length of perpendicular lines from the reference point a and the reference point b to a north and south pole axis, respectively. Reason of becoming La:Lb=ra:rb is as follows. That is, when it images circles having radiuses of ra and rb and being parallel to an equatorial plane, La corresponds to 1/n (n: predetermined number) of a length of a circumference whose radius is ra (i.e., $2\pi ra$). On the contrary, Lb corresponds to 1/n (n: predetermined number) of a length of a circumference whose radius is rb (i.e., $2\pi rb$). Therefore, La:Lb=$2\pi ra/n:2\pi rb/n$=ra:rb.

Hence, ra and rb may be used, when the distortion correction coefficient of the actual length La at the correction point b with respect to the actual length La at the reference point a is considered. Here, the following equations are established.

$$ra = r \cdot \sin \theta a, \quad rb = r \cdot \sin \theta b$$

Here, as shown in FIG. 3C, r is a distance from the center of the earth to the reference point a and the correction point b each of which is equal to the radius of the earth. The $\theta a$ corresponds to an angle of a line which connecting the reference point a and the center of the earth with respect to the equatorial plane, and the $\theta b$ corresponds to an angle of a line which connecting the correction point b and the center of the earth with respect to the equatorial plane. That is, the $\theta a$ and the $\theta b$ in FIG. 3C show "north latitude".

Therefore, the distortion correction coefficient Hs at the correction point b with respect to the reference point a can be explained as follows.

$$Hs = rb/ra = \sin \theta b / \sin \theta a$$

The distortion correction coefficient Hs is determined every a predetermined latitude width. For example, when a correction resolution is 0.05 and a Japan map is used, the following distortion correction coefficients Hs are determined.

| Latitude range (Northlatitude [degree]) | Correlation coefficient Hs |
| --- | --- |
| 24.0000–27.0378 | 1 |
| 27.0379–32.3249 | 0.95 |
| 32.3250–36.9317 | 0.90 |
| 36.9318–41.0903 | 0.85 |
| 41.0904–46.7519 | 0.80 |

Here, the specific values in the above list are only one example. The present invention is not limited to these specific values. For example, the latitude width may be more finely determined so that the resolution of the correction coefficient Hs becomes finer.

Figure 2:
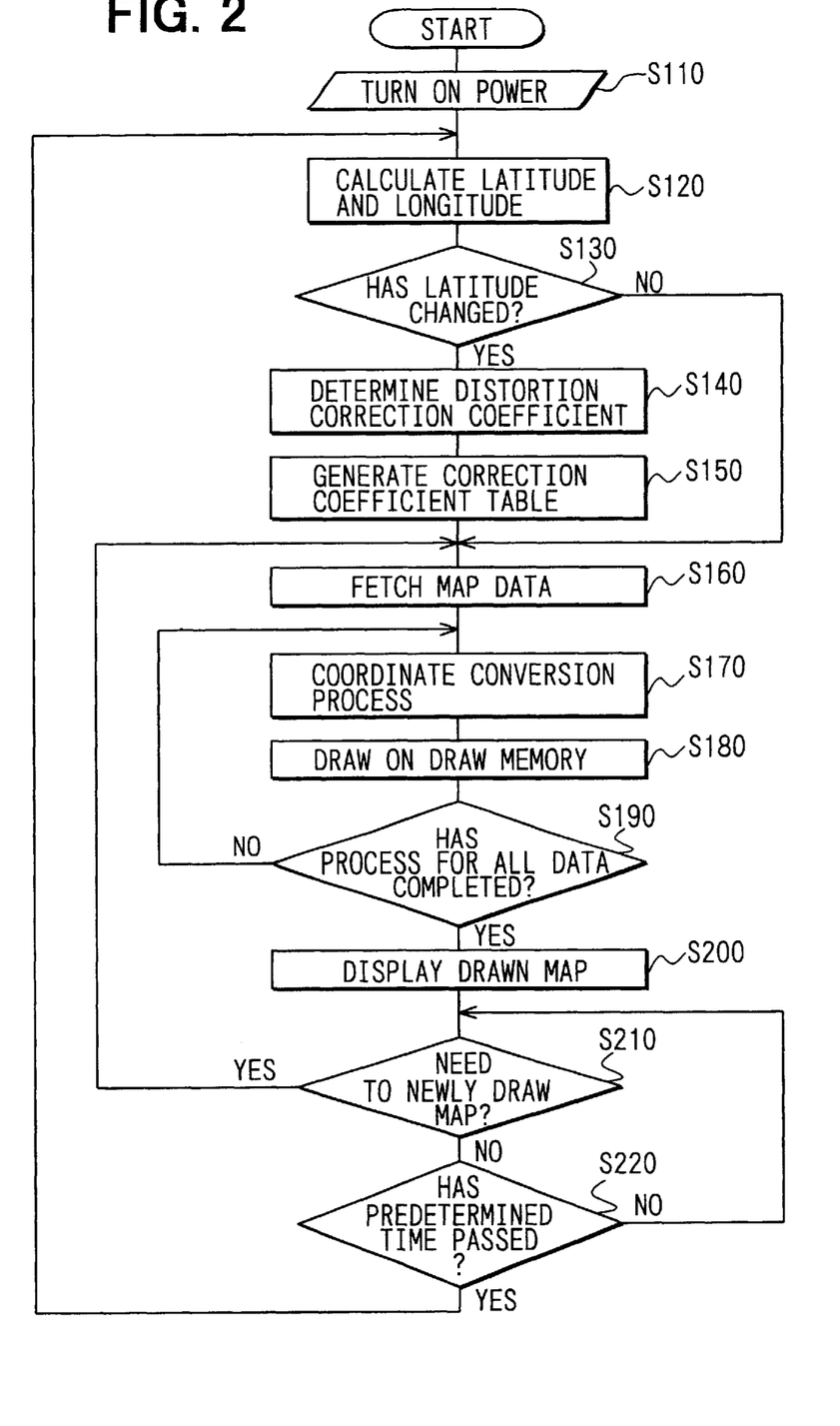
FIG. 2 is a flowchart illustrating a process executed by a controller.

At step S150 in the flowchart shown in FIG. 2, the control portion 20 generates a table of correction coefficient for coordinate conversion (coordinate conversion correction coefficient) Ht. The coordinate conversion correction coefficient Ht is calculated by multiplying the distortion correction coefficient Hs determined at the step S140 and the sine value of the rotation angle (sin value), and will be explained hereinafter.

In general, when the map is displayed in the navigation system 1, it is inconvenient to apply a north fixing (north up) in which the north in the map is always displayed at upper side in a screen. Therefore, the map is rotatably displayed by a unit of a predetermined angle such as 5 degree ($=\pi/36$ radian). In this way, it can realize "heading up display" in which a travel direction of the vehicle is always displayed at upper side in the screen.

Figure 4:
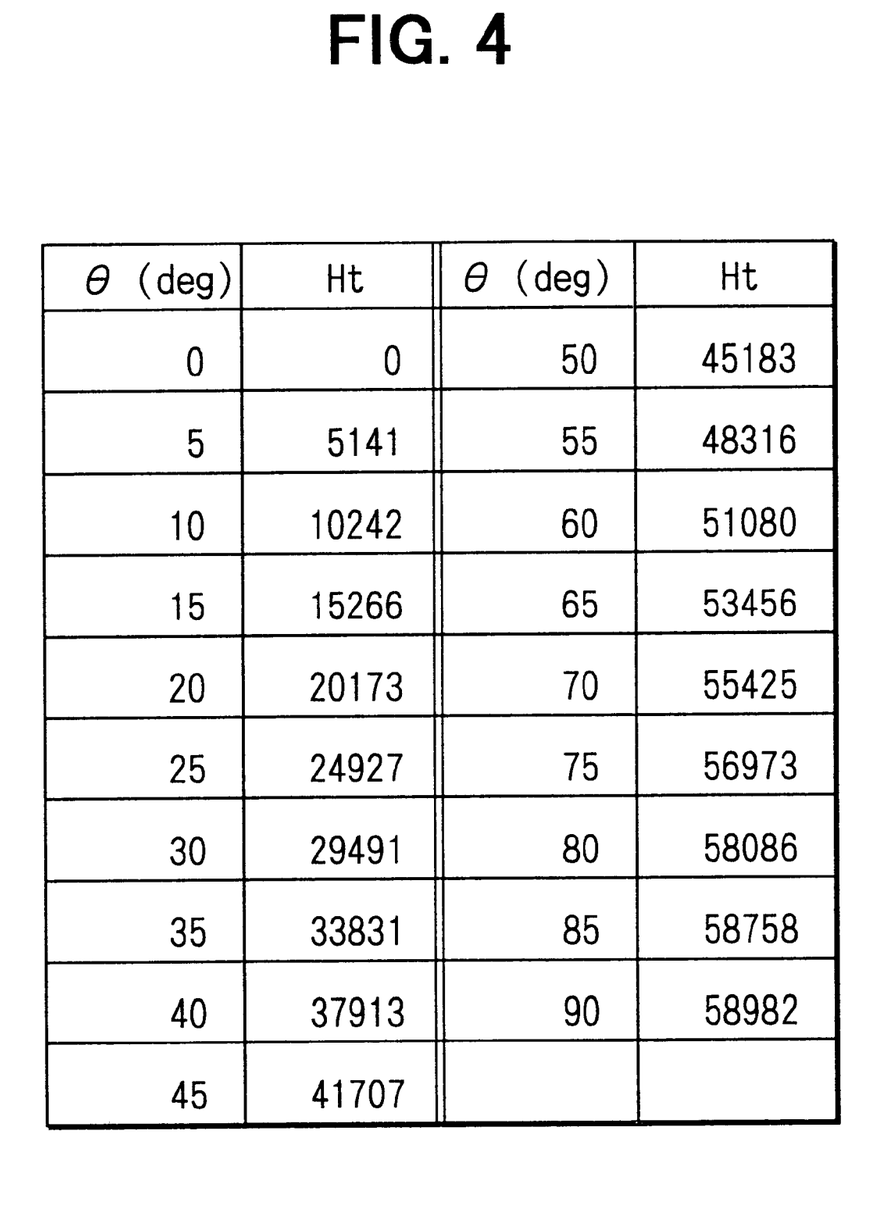
FIG. 4 is a correction coefficient table for coordinate conversion.

In this rotation process, it needs to use both values of $\sin \theta$ and $\cos \theta$ with respect to the rotation angle $\theta$. Therefore, in order to process in a short time, approximate values are calculated and stored in advance. Furthermore, the approximate values of multiplied values of the distortion correction coefficient Hs decided at step S140 by the sin value of the rotation angle are calculated as the coordinate conversion correction coefficient Ht. Specifically, Ht=Hs×sin $\theta$. FIG. 4 shows a coordinate conversion correction coefficient table.

These coordinate conversion correction coefficients Ht in this table are calculated under a condition that the distortion correction coefficient Hs is 0.9, and the rotation angle θ is determined by a unit of 5 degrees within 0–90 degrees. The correction coefficients themselves are approximated values. From a viewpoint of a process, the approximated values are converted to integers. Specifically, Ht=Hs×sin θ (approximate value)×2$^{16}$. Therefore, when θ=5 degree, the coordinate conversion correction coefficient Ht can be calculated as follows.

$$Ht = Hs \times \sin\theta \text{ (approximate value)} \times 2^{16}$$
$$= 0.9 \times 0.08715574274 \times 2^{16}$$
$$= 5141$$

Here, the table in FIG. 4 only shows the coordinate conversion correction coefficients using the sin value. In a case of cos value, the table may be reversely referred. That is, according to a relation of cos θ=sin (90°−θ), the coordinate conversion correction coefficient for cos 15° is equal to that of sin 75°.

Furthermore, the table in FIG. 4 only shows the coordinate conversion correction coefficients where the rotation angles θ are within 0–90 degrees; however, that of the other angles can be calculated by using the coordinate conversion correction coefficients where the rotation angles θ are within 0–90 degrees. For example, in a case of the range of 90–180 degrees, a relationship of sin (90°+θ)=cos θ may be used; in a case of the range of 180–270 degrees, a relationship of sin (180°+θ)=−sin θ may be used; and in a case of the range of 270–360 degrees, a relationship of sin (270°+θ)=−cos θ may be used. Here, a relationship of sin θ=−sin θ may be used by assuming 0−−90 degrees. All the same, the table in FIG. 4 can be used for all rotation angles.

Here, a table which can cover 0–360 degrees may be used, and further a table which can correspond cos value may be additionally prepared. However, it is preferable to apply a conversion method described in the above to reduce an amount of data to be stored in the memory portion 15.

Therefore, at step S150 in FIG. 2, the coordinate conversion correction coefficient table as shown in FIG. 4 is prepared for each of the distortion correction coefficients Hs=1, 0.95, 0.9, 0.85, and 0.8.

At following step S160, the control portion 20 fetches the map data which is necessary to draw the map including the present position or an assigned position from the map data storage portion 12. Then, at step S170, the control portion 20 performs the coordinate conversion of the predetermined coordinate train in the map data. Specifically, in the case of the road data, the coordinate train of points along the road shape is converted; and in the case of rivers or facilities specified by area, the coordinate train of polygon is converted.

The coordinate conversion process in the above can be notionally expressed as in an equation (1).

$$\begin{pmatrix} X \\ Y \end{pmatrix} = \begin{pmatrix} a \\ b \end{pmatrix}\begin{pmatrix} \cos\theta & -\sin\theta \\ \sin\theta & \cos\theta \end{pmatrix}\begin{pmatrix} x \\ y \end{pmatrix} \quad (1)$$

Here, X and Y are coordinate values after a rotation calculation and a distortion correction; x and y are coordinate values fetched from a map storage portion; θ is a rotation angle of the map; and a and b are correction coefficients.

The equation (1) can be simplified as in equation (2) by using the coordinate conversion correction coefficients in the table generated at step S150. Here, the coordinate conversion correction coefficient with respect to the sin value of the rotation angle θ in the map is set α; and the coordinate conversion correction coefficient with respect to the cos value of the rotation angle θ in the map is set β.

$$X=\beta x-\alpha y, Y=\alpha x+\beta y \quad (2)$$

At following step S180, lines or polygons are drawn on the draw memory portion 17 in accordance with the coordinate values after coordinate conversion at step S170. In this way, the line indicating the shape of the road or the polygon indicating the river or facilities are drawn.

At step S190, the control portion 20 judges whether all the coordinate conversions and the draw processes with respect to all data to be drawn are completed or not. When all of them are not completed (S190: NO), the control portion 20 repeats the coordinate conversion process at step S170 and the draw process at step S180. On the contrary, when all of them are completed (S190:YES), the control portion 20 displays drawn map on the display portion 14 (S200).

At step S210, the control portion 20 judges whether it needs to newly draw the map or not. For example, when the present position is moved as a result of vehicle's travel, and when the map should be scrolled, the control portion 20 determines that it needs to newly draw the map. Furthermore, when an assigned point to be displayed is out of the map that is presently displayed, the control portion 20 also determines that it needs to newly draw the map.

Therefore, when it needs to newly draw the map (S210:YES), the control portion 20 returns to step S160 to execute the process for newly drawing the map (S160–S200). On the contrary, when it does not need to do so (S210:NO), the control portion 20 moves to step S220 to judge whether a predetermined time has passed or not from a time the coordinate conversion correction coefficient table has generated. When the predetermined time has not passed (S220:NO), the control portion 20 returns to step S210. On the contrary, when the predetermined time has passed (S210:YES), the control portion 20 returns to step S120. In other words, according to this embodiment, there is a chance to generate the coordinate conversion correction coefficient table after power on (step S110), and there is a chance to regenerate the coordinate conversion correction coefficient table every time the predetermined time has passed after generating the previous coordinate conversion correction coefficient table.

Here, as can be understood from the explanation in the above, in this embodiment, the map data storage portion 12 corresponds to "map data storage means"; the display portion 14 corresponds to "map display means"; the control portion 20 corresponds to "map display control means", "distortion correction coefficient decision means", or "coordinate conversion correction coefficient generation means"; the position detection portion 11 corresponds to "present position detection means"; the memory portion 15 corresponds to "distortion correction coefficient storage means" or "coordinate conversion correction coefficient storage means"; and the switch information input portion 13 corresponds to "indication input means".

As described in the above, according to the navigation system 1 of this embodiment, when the control portion 20 draws the map, the control portion 20 fetches necessary map data from the map data storage portion 12 to draw the map including the present position or the assigned position (step S160). Next, at step S170, the control portion 20 performs the coordinate conversion of the predetermined coordinate train in the map data. Specifically, in the case of the road data, the coordinate train of points along the road shape is converted; and in the case of rivers or facilities specified by area, the coordinate train of polygon is converted. In this coordinate conversion process, the conversion process can be simplified as shown in the equation (2), by using the coordinate conversion correction coefficients in the table generated at step S150. The coordinate values X and Y after conversion can be respectively calculated by X=βx−αy, Y=αx+βy, by using the coordinate conversion correction coefficient α with respect to the sin value of the rotation angle θ in the map and the coordinate conversion correction coefficient β with respect to the cos value of the rotation angle θ in the map.

Here, a related art has used an approximate table of sine (hereafter sin) values and cosine (hereafter cos) values. According to the related art, during the drawing, the distortion correction coefficient Hs is determined by calculating the rectangle to be approximated with respect to the latitude of a drawing center of the map, and the distortion correction coefficient Hs is multiplied by the rotation angle of the map. Moreover, when the distortion correction coefficient for x-coordinate is a, the distortion correction coefficient for y-coordinate is b, (approximate value of) the sin value with respect to the rotation angle θ of the map to be drawn is γ, and (approximate value of) the cos value with respect to the rotation angle θ of the map to be drawn is δ, the coordinate values X and Y after conversion are expressed as the following equation (3).

$$X=a\delta x-a\gamma y, \; Y=b\gamma x+b\delta y \tag{3}$$

Therefore, the number of multiplications of the equation (2) is smaller than that of equation (3) by four times. Since this conversion process is executed every coordinate, the total process load can be remarkably reduced. Furthermore, the distortion correction coefficient is not determined during the drawing, but is determined before the drawing in advance. In this way, since the distortion correction coefficient Hs is not decided during the drawing and it is not necessary to perform a process for multiplying the coefficient for correcting the rotation angle by the distortion correction coefficient Hs, this embodiment can adequately correct distortion of map with restricting a decrease of a map drawing speed.

Here, in this case, when the map that includes the latitude out of the latitude range including the present position, the distortion may not be adequately corrected. However, there might be no practical inconvenience. In depends on the latitude range to be set, however, it is practically enough even in a unit of approximately 5 degrees. In this embodiment, the latitude range is set from approximately 3 degrees to approximately 5 degrees, and can cover almost all of practically used area. For example, in the case of the navigation system, when a user sets the destination to use the route guidance function, it is quite rare for the user to set quite far place from the present position. Furthermore, even if the user does not use the route guidance function, it can be thought that it is rare to see the map including so far place from the present position to see the map including the destination. Therefore, the area in the latitude range of 3–5 degrees can sufficiently cover the actual use.

According to this embodiment, there is not only a chance to generate the coordinate conversion correction coefficient table after power on (step S110) but also a chance to regenerate the coordinate conversion correction coefficient table every time the predetermined time has passed after generating the previous coordinate conversion correction coefficient table (S220: YES). Therefore, even if the vehicle moves to the other latitude range, the control portion 20 can change the correction coefficient depending on the range.

Moreover, the control portion 20 performs steps S140 and S150 to generate a correction coefficient table for coordinate conversion when the latitude range has changed (S130:YES). In other words, when the latitude range has not changed (S130:NO), the control portion 20 uses the coordinate conversion correction coefficient table generated in the last time to eliminate unnecessary processes.

Other Embodiment (1) Regarding a Generation Timing of the Coordinate Conversion Correction Coefficient Table:

In the case of the above embodiment, there is a chance to generate the coordinate conversion correction coefficient table every time the predetermined time has passed after the table is generated, in addition to just after the power on. There may be a change to generate the coordinate conversion correction coefficient table every time the vehicle travels a predetermined distance. Moreover, these may be combined, so that there is a change to generate the coordinate conversion correction coefficient table every time the predetermined time has passed or vehicle travels predetermined distance.

Furthermore, in addition to the automatic generation of the coordinate conversion correction coefficient table by the control portion 20, a manually input unit to which the user manually inputs a voluntary timing may be provided. For example, if the user sees the display condition and desires to correct the distortion, this method is acceptable.

(2) Regarding the Generation of The Coordinate Conversion Correction Coefficient Table:

In the above embodiment, the coordinate conversion correction coefficient table is generated after the power on and before actually drawing the map, so as to prevent generating the coordinate conversion correction coefficient table during the drawing. However, a table previously generated may be stored to eliminate the generation of the table. In detail, all of the coordinate conversion correction coefficient tables are previously stored in the memory portion 15 with respect to every predetermined latitude width. When the map is drawn, the control portion 20 fetches the coordinate conversion correction coefficient table corresponding to the latitude of a target area to be drawn, and converts the map data using the coordinate conversion correction coefficients in the table. In this case, the map out of the latitude range including the present position may be also adequately displayed.

Here, since it needs to store all of the coordinate conversion correction coefficient tables for plural latitude ranges, amount of data becomes relatively large. Therefore, practically, it is preferable to reduce the amount of the data of the coordinate conversion correction coefficient table from a viewpoint of a storage capacity of the memory portion 15.

(3) Others:

In the above embodiment, the present invention is applied to the vehicular navigation system; however, the present invention may be applied to other navigation system other than for vehicle, or may be applied to other system other than navigation system.

In the above embodiment, the Japan map is used to explain the present invention; however, the present invention may be applied to the other countries in the world. This case can achieve similar effect as that of the Japan map.

What is claimed is:

1. A map display apparatus comprising:

a data storage portion for storing map data, the map data being generated by assuming that an area surrounded by particular longitudes and particular latitudes is one of a rectangle and a square;

a display control portion for generating a map of a target area by using the map data stored in the data storage portion and a distortion correction coefficient, the distortion correction coefficient being for correcting a distortion of the map caused by difference in a ratio of a corresponding length in the map and an actual length with respect to a latitude;

a distortion correction coefficient storage portion for storing distortion correction coefficients by a unit of a predetermined latitude width, wherein the display control portion reads a particular distortion correction coefficient corresponding to a latitude of a particular point in the target area from the distortion correction coefficient storage portion, and converts the map data using the particular distortion correction coefficient.

2. A map display apparatus comprising:

a data storage portion for storing map data, the map data being generated by assuming that an area surrounded by particular longitudes and particular latitudes is one of a rectangle and a square;

a display control portion for generating a map of a target area by correcting the map data stored in the data storage portion using a distortion correction coefficient and by coordinate-converting a corrected map data based on a rotation angle of the map with respect to a reference direction, the distortion correction coefficient being for correcting a distortion of the map caused by differences in a ratio of a corresponding length in the map and an actual length with respect to a latitude; and a coordinate conversion correction coefficient storage portion for storing coordinate conversion correction coefficients by a unit of a predetermined latitude width with respect to a rotation correction coefficient corresponding to a rotation angle, the coordinate conversion correction coefficients being determined by multiplying the rotation correction coefficient corresponding to each rotation angle by the distortion correction coefficient, and the rotation angles of the map with respect to the reference direction being determined by a predetermined angle unit, wherein the display control portion reads a particular coordinate conversion correction coefficient corresponding to a latitude of a particular point in a target area from the coordinate conversion correction coefficient storage portion, and converts the map data using the particular coordinate conversion correction coefficient.

3. A map display apparatus comprising:

a data storage portion for storing map data, the map data being generated by assuming that an area surrounded by particular longitudes and particular latitudes is one of a rectangle and a square;

a display control portion for generating a map of a target area by using the map data stored in the data storage portion and a distortion correction coefficient, the distortion correction coefficient being for correcting a distortion of the map caused by differences in a ratio of a corresponding length in the map and an actual length with respect to a latitude;

a present position detection portion for detecting a present position;

a distortion correction coefficient determination portion for determining a distortion correction coefficient at a latitude of the present position detected by the present position detection portion after power on; and a distortion correction coefficient storage portion for storing distortion correction coefficient determined by the distortion correction coefficient determination portion, wherein the display control portion converts the map data using the particular distortion correction coefficient stored in the distortion correction coefficient storage portion.

4. A map display apparatus comprising:

a data storage portion for storing map data, the map data being generated by assuming that an area surrounded by particular longitudes and particular latitudes is one of a rectangle and a square;

a display control portion for generating a map of a target area by correcting the map data stored in the data storage portion using a distortion correction coefficient and by coordinate-converting a corrected map data based on a rotation angle of the map with respect to a reference direction, the distortion correction coefficient being for correcting a distortion of the map caused by differences in a ratio of a corresponding length in the map and an actual length with respect to a latitude;

a present position detection portion for detecting a present position;

a distortion correction coefficient determination portion for determining a distortion correction coefficient at a latitude of the present position detected by the present position detection portion after a predetermined timing from a power on;

a coordinate conversion correction coefficient generation portion for generating coordinate conversion correction coefficients, the coordinate conversion correction coefficients being determined by multiplying each rotation angle by the distortion correction coefficient, and the rotation angles of the map with respect to the reference direction being determined by a predetermined angle unit; and a coordinate conversion correction coefficient storage portion for storing coordinate conversion correction coefficients generated by the coordinate conversion correction coefficient generation portion, wherein the display control portion converts the map data using the coordinate conversion correction coefficient stored in the coordinate conversion correction coefficient generation portion.

5. A map display apparatus according to claim 4, wherein the predetermined timing is a time a power is turned on.

6. A map display apparatus according to claim 4, wherein the predetermined timing is a time after a predetermined time from a power on.

7. A map display apparatus according to claim 4, wherein the map display apparatus is to be mounted on a vehicle, and the predetermined timing is a time after the vehicle travels a predetermined distance after a power on.

8. A map display apparatus according to claim 4, wherein the predetermined timing is a time when a power is turned on, and every a predetermined time has passed after the power is turned on.

9. A map display apparatus according to claim 4, wherein the map display apparatus is to be mounted on a vehicle, and the predetermined timing is a time when a power is turned on, and every a predetermined time has passed after a power on and every time the vehicle travels a predetermined distance after the power is turned on.

10. A map display apparatus according to claim 8, wherein when the present position detected by the present position detection portion in this time is out of a latitude range in which the present position detected in last time is included, the distortion correction coefficient determination portion determines the distortion correction coefficient;

the coordinate conversion correction coefficient generation portion generates the coordinate conversion correction coefficients; and the coordinate conversion correction coefficient storage portion stores the coordinate conversion correction coefficients to update the same.

11. A map display apparatus according to claim 4, further comprising:

an instruct input portion for inputting an instruction for generating the coordinate conversion correction coefficients by a user, wherein the predetermined timing is a time when the instruction for generating the coordinate conversion correction coefficients is inputted via the instruct input portion.

12. A map display apparatus according to claim 1, further comprising:

a display portion for displaying the map generated by the display control portion.

13. A method of displaying a map comprising:

detecting a present position;

determining a distortion correction coefficient at a latitude of the detected present position;

converting previously prepared map data using the distortion correction coefficient; and displaying a map based on the converted map data.

14. A method of displaying a map according to claim 13, further comprising:

judging whether the present position detected in this time is out of the present position detected in last time, wherein:

when the present position detected in this time is out of the present position detected in last time, the distortion correction coefficient at a latitude of the detected present position is determined, the previously prepared map data using the distortion correction coefficient is converted, and the map is displayed based on the converted map data; and when the present position detected in this time is not out of the present position detected in last time, the map is displayed based on the map data used in the last time.

15. A method of displaying a map comprising:

detecting a present position;

determining a distortion correction coefficient at a latitude of the detected present position;

generating a coordinate conversion correction coefficient by multiplying a rotation angle by the distortion correction coefficient, the rotation angle of the map with respect to the reference direction being determined by a predetermined angle unit;

converting previously prepared map data using the coordinate conversion correction coefficient;

displaying a map based on the converted map data.

16. A method of displaying a map according to claim 13, further comprising:

judging whether the present position detected in this time is out of the present position detected in last time, wherein:

when the present position detected in this time is out of the present position detected in last time, the distortion correction coefficient at a latitude of the detected present position is determined, the coordinate conversion correction coefficients are generated, the previously prepared map data is converted, and the map is displayed based on the converted map data; and when the present position detected in this time is not out of the present position detected in last time, the map is displayed based on the map data used in the last time.

17. A method of displaying a map comprising:

detecting a present position;

determining a distortion correction coefficient at a latitude of the detected present position;

generating a coordinate conversion correction coefficient by multiplying a rotation angle by the distortion correction coefficient, the rotation angles of the map with respect to the reference direction being determined by a predetermined angle unit;

converting previously prepared map data using the distortion correction coefficient and the coordinate conversion correction coefficient;

displaying a map based on the converted map data.

* * * * *